(12) United States Patent
Warburton

(10) Patent No.: US 9,463,729 B2
(45) Date of Patent: Oct. 11, 2016

(54) SLIDE AND DUMP TRAILER

(75) Inventor: Greg P. Warburton, Tooele, UT (US)

(73) Assignee: Greg Peter Warburton, Tooele, UT (US)

( * ) Notice: Subject to any disclaimer, the term of this patent is extended or adjusted under 35 U.S.C. 154(b) by 894 days.

(21) Appl. No.: 13/558,026

(22) Filed: Jul. 25, 2012

(65) Prior Publication Data

US 2013/0034422 A1 Feb. 7, 2013

Related U.S. Application Data

(60) Provisional application No. 61/514,583, filed on Aug. 3, 2011.

(51) Int. Cl.
*B60P 1/08* (2006.01)
*B60P 1/12* (2006.01)

(52) U.S. Cl.
CPC ... *B60P 1/12* (2013.01); *B60P 1/08* (2013.01)

(58) Field of Classification Search
CPC .......................................................... B60P 1/08
USPC .......................................................... 414/483
See application file for complete search history.

(56) References Cited

U.S. PATENT DOCUMENTS

| | | | | |
|---|---|---|---|---|
| 611,542 A | * | 9/1898 | Wilson | 414/436 |
| 2,717,707 A | * | 9/1955 | Martin | 414/475 |
| 3,987,919 A | * | 10/1976 | Weeks et al. | 414/471 |
| 4,130,211 A | * | 12/1978 | Abascal | 414/475 |
| 4,568,235 A | * | 2/1986 | Bills, Jr. | 414/477 |
| 4,806,061 A | * | 2/1989 | Fenton | 414/475 |
| 5,013,056 A | * | 5/1991 | Landoll et al. | 280/425.2 |
| 5,092,623 A | | 3/1992 | Swanner | |
| 5,137,414 A | * | 8/1992 | Sloan et al. | 414/477 |
| 5,564,883 A | | 10/1996 | Swanner | |
| 5,667,231 A | * | 9/1997 | Dierks et al. | 280/149.2 |
| 6,086,082 A | * | 7/2000 | Andol | 280/414.1 |
| 6,238,166 B1 | * | 5/2001 | Collier | 414/436 |
| 2009/0322057 A1 | * | 12/2009 | Quenzi et al. | 280/423.1 |

* cited by examiner

*Primary Examiner* — Jonathan Snelting
(74) *Attorney, Agent, or Firm* — Worbie Limited Partners

(57) ABSTRACT

A sliding dump trailer that provides dumping, loading, and unloading functionality using mechanical manipulations. A bed frame is attached to a towing tongue using hinges, and one or more slide rails. The slide rails selectively engage and disengage with an axle frame. The bed frame is manipulated to a loading/unloading position by locking wheels on the axle frame, disengaging the axle frame from the slide rails, and pushing the tongue in a reverse direction, causing the slide rails to slide over the axle frame which, in turn, allows the bed frame to tilt over the hinges. Continuing to push the tongue in the reverse direction further tilts the bed frame to a dumping position. The bed frame is returned to a horizontal towing position by pulling the tongue in a forward direction.

18 Claims, 2 Drawing Sheets

SLIDE AND DUMP TRAILER

CROSS-REFERENCE TO RELATED APPLICATIONS

This application claims the benefit of and priority to U.S. Provisional Patent Application Ser. No. 61/514,583 filed on Aug. 3, 2011 and entitled "SLIDE AND DUMP TRAILER," which application is expressly incorporated herein by reference in its entirety.

BACKGROUND

1. The Field of the Invention

This invention relates to dump trailers that provide functionality for dumping, loading, and unloading using mechanical manipulations.

2. The Relevant Technology

Unpowered trailers that are pulled behind powered vehicles have become commonplace in modern society. Trailers are used for transporting a nearly limitless variety of cargo, including cargo for use in industry, cargo for use in commerce, and cargo for personal use. At a most basic level, most trailers include a bed frame on which loads can be supported, one or more axles to which tires are attached, and a tongue that incorporates a hitch mechanism for attaching the trailer to a vehicle. Due to the vast range of goods and loads that can be transported using trailers, a variety of trailer styles are currently in use.

Some trailer styles incorporate stationary beds onto which a cargo can be placed or attached. For instance, trailers that use stationary beds are commonly used to transport equipment, such as all-terrain vehicles (ATV's), farm or industrial equipment, movable or stationary equipment, etc. Trailers that have stationary beds, and particularly those that incorporate side retaining walls, can also be used to transport raw materials, such as building and landscaping materials (e.g., dirt, gravel, bark, etc.), garbage, crops, etc. Loading and unloading stationary bed trailers can be troublesome and inconvenient. For instance, loading and unloading equipment may involve the use additional equipment or implements, such as cranes, integrated or separate ramps, earthen ramps, loading docks, etc. Loading and unloading raw materials (e.g., dirt, gravel, bark) can present further complications, often requiring manual use of loaders, shovels, etc.

Other trailer styles incorporate dumping beds that can tilt to assist with the loading and unloading of goods. These trailers can ease much of the difficulty of loading and unloading a trailer, as the trailer can—itself—serve as a ramp, or the trailer can "dump" cargo from the bed area. However, dumping bed trailers are commonly associated with additional cost, maintenance, and safety concerns. Many dumping bed trailers employ the use of combustive, electrical, or hydraulic power to raise and lower the dumping bed. While these power sources can ease much of the manual labor required for loading and unloading, the hardware associated with these power sources (e.g., engines, motors, hoses, wiring, gears, belts, etc.) can be expensive to purchase, can involve significant maintenance and repair, and can be dangerous to use.

Some dumping bed trailers operate more simply by enabling the trailer bed to tilt over a single stationary axle. Dumping the trailer then involves tilting the bed by shifting the load on the bed (often towards the rear of the bed) until the bed tilts over the single stationary axle. Often times, this can involve one or more users manually re-adjusting loads, or even standing or jumping on the back of the bed, until the bed tilts. When the bed does tilt, it often does so quickly and can throw the user, shift the load, or otherwise create an unsafe situation. Furthermore, in order to allow these trailers to tip to a dumping position, these trailers usually position the single stationary axle in the middle of the trailer. Placing the axel near the middle of the trailer, as opposed to the rear of the trailer, reduces the stability of the trailer during towing and can cause the trailer to tow improperly or unsafely. Similarly, some users often use stationary bed trailers as dumping bed trailers by unhitching the trailer and shifting the weight on the trailer to cause it to rotate about a stationary axle. This can be particularly unsafe, as an unhitched trailer has a broad freedom of movement.

BRIEF SUMMARY

The present invention extends to a sliding dump trailer design that incorporates one or more sliding axles with a hinged tilting bed frame, which provides functionality for dumping, loading, and unloading using mechanical manipulations.

In one or more embodiments, a dumping trailer can include a bed frame that is attached to a towing tongue using hinges that create one more hinge points between the bed frame and the towing tongue. The bed frame is attached to slide rails which are, in turn, are secured to and ride on an axle frame. A locking mechanism selectively engages and disengages the axle frame with the slide rails. When the locking mechanism is disengaged, the slide rails are free to slide along the axle frame.

A method for tilting a dumping trailer into a loading/unloading position can include disengaging a locking mechanism that locks an axle frame to slide rails and locking wheels attached to the axle frame. Subsequently moving a trailer tongue in a reverse direction causes the slide rails to slide on the axle frame in the reverse direction until the axle frame no longer supports a rear portion of a trailer bed, after which the trailer bed tilts relative to the tongue at a hinge point until the trailer bed engages with the ground.

This Summary is not intended to identify key features or essential features of the claimed subject matter, nor is it intended to be used as an aid in determining the scope of the claimed subject matter.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to embodiments for a sliding dump trailer design that incorporates one or more sliding axles with a hinged tilting bed frame, which provides functionality for dumping, loading, and unloading using mechanical manipulations.

One or more embodiments improve on trailer technology by providing one or more trailer designs that incorporate a unique and novel combination of sliding axles and hinged tilting beds, which enables trailers to be used for dumping or loading without the safety, cost, and convenience concerns that accompany dumping trailers. These designs provide for purely mechanical dump trailers capable of continuous, reliable dumping. The designs also provide for dump trailers having little to no maintenance, such as charging, changing fluids, etc.

One or more embodiments include trailers that comprise one or more slide rails that enable one or more axles of the trailer to be relocated (e.g., forward or reverse) on the trailer by reversing or pulling forward a towing vehicle. Relocating the one or more axles on the trailer alters the support provided to a hinged bed frame, thereby allowing gravity to tilt the bed frame over a hinge point. For instance, relocating the axles forward on the trailer allows gravity to tilt the bed frame over a hinge point when the axles reach a position that no longer supports the weight of the rear of the bed frame. One or more hinge points can be provided through hinges that attach the bed frame to a towing platform (e.g., a tongue).

Figure 1:
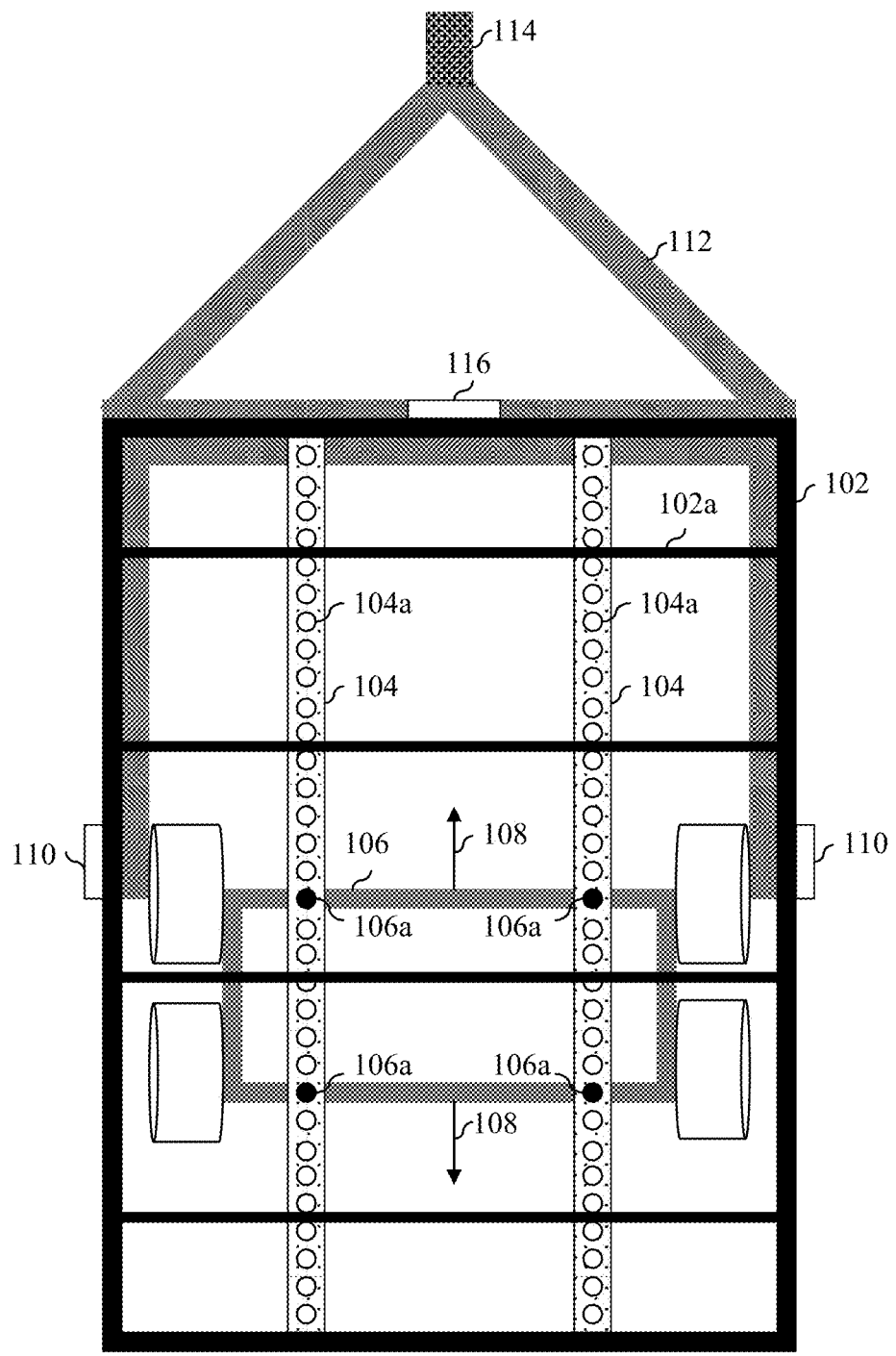
FIG. 1 illustrates a top view of a sliding dump trailer that incorporates one or more sliding axles with a hinged tilting bed frame according to one or more embodiments of the invention.

FIG. 1 illustrates a top view, according to one or more embodiments, of a sliding dump trailer that incorporates a sliding axle with a hinged tilting bed frame. As shown, the sliding dump trailer can include a bed frame 102 (or platform). The bed frame 102 can comprise any appropriate material (e.g., steel, aluminum) that provides adequate load support, and can optionally include one or more support cross-members 102a to provide additional strength and support. The bed frame 102 can be covered with a supportive material (e.g., sheet metal, wood, plastic, etc.), not shown, that provides a surface onto which a load can be placed. The bed frame 102 can also optionally include one or more side support members (e.g., side boards or walls), not shown, to help contain a load.

The bed frame 102 is attached to (e.g., welded and/or bolted on top of) one or more slide rails, such as the illustrated inset parallel slide rails 104, along which one or more axle frames 106 are enabled to slide. In other words, sliding along the slide rails 104, the one or more axle frames 106 are able to move to the front and to the back of the bed frame 102 (as indicated by the arrows 108) and alter the support provided to the axle frame 106 relative to the center of gravity of the axle frame 106. From a different perspective, the slide rails 104 are able to slide over the one or more axle frames 106. Each axle frame 106 can support one or more axles (e.g., suspension bearing axles), and each axle can have two or more tires attached thereto (e.g., one or more tires on each end of the axle). As illustrated, for example, axle frame 106 supports two axles and four tires. However, the invention is not limited to this embodiment. The number and rating of the suspension bearing axles can be determined by an anticipated load weight rating of the trailer. In some embodiments the axle frame 106 is comprised of steel, but any other appropriate material is within the scope of this disclosure. One or more embodiments also include one or more lift spacers (not shown) positioned between the axle frame and the suspension bearing axle(s) to provide an optimal angle for initial dumping.

One or more of the slide rails 104 or the axle frame(s) 106 can include one or more locking mechanisms for selectively enabling or disabling the ability of the slide rails 104 to slide along the axle frame(s) 106. In the illustrated embodiment, for example, each of the slide rails 104 includes a plurality of incremented pin holes 104a which are configured to engage with one or more pins (e.g., pins 106a that are connected to the axle frame 106). Engaging the pins 106a with the pin holes 104a prevents the axle frame 106 and the slide rails 104 from moving with respect to one another, while disengaging the pins 106a from the pin holes 104a enables the axle frame 106 and the slide rails 104 to slide freely.

In some embodiments, the pins 106a are engaged/disengaged using a spring-operated pull mechanism (not shown) that is connected to the axle frame 106 and that is positioned between the side rails 104. In this embodiment, the pull mechanism can be operated manually with a handle or lever (e.g., a spring returned handle) that retracts or extends the locking pins 106a into the pin holes 104a. The pins 106a can be connected to springs that extend and retract as the handle or lever is actuated. When the handle or lever is pulled, the springs retract, pulling the pins 106a out of the pin holes 104a. The handle is then locked into place in the retracted position. When the handle is released the springs extend, forcing the attached pins 106a into the pin holes 104a of the slide rails 104 and axle frame when the pins 106a are aligned with the pin holes 104a. Alternatively, the pins 106a can be actuated using any other appropriate mechanism. For instance, the pins 106a can be actuated using one or more of electrical motors, combustion engines, hydraulics, compressed air, magnets, etc.

As illustrated, two pins 106a are shown as engaging with each slide rail 104, but the invention is not limited to this embodiment, and more pins or fewer pins can be engaged with each slide rail 104 in connection with each axle frame 106. Additionally, while the pin holes 104a are shown, for ease in description and illustration, as being positioned vertically through the slide rails 104, the pin holes 104a can also be situated horizontally through the slide rails. For instance, when the pin holes 104a are positioned horizontally through the slide rails, the pull mechanism described above can pull the pins 106a inward, towards the pull mechanism and the center of the trailer, and out of the pin holes 104a. The pin holes 104a can extend entirely through the slide rails 104, or part way through the slide rails 104.

Any appropriate locking mechanism for selectively enabling or disabling the ability of the axle frame(s) 106 to slide along the slide rails 104 falls within the scope of this disclosure. For instance, instead of pins and pin holes, one or more embodiments use notches and teeth. Alternatively, one or more embodiments also employ frictional braking mechanisms. Other configurations are also possible, each of which can be operated manually or with the use of motors, engines, hydraulics, and the like.

The slide rails 104 can engage and be connected with the axle frame(s) 106 in any appropriate manner. In one or more embodiments, one or more of the slide rails 104 or the axle frame(s) 106 include a friction-reduction mechanism. For example, the slide rails 104 can ride on Teflon™ friction-reducing strips, which act as a bearing for the movement of the slide rails 104 on the axle frame 106. Further, in some embodiments the slide rails 104 are held to the axle frame 106 using "C" brackets (which may also be lined with Teflon™) which secure the slide rails 104 to the axle frame 106 while still allowing the slide rails 104 to ride on or slide along the axle frame 106. Other combinations are also possible, such as "I" beam rails and axle frames(s) 106 that include rollers that engage with the "I" beams (much like a roller-coaster).

The sliding dump trailer can also include a tongue 112 (or towing apparatus). The tongue 112 can be positioned beneath the bed frame 102 and can extend over a potentially significant length of the bed frame 102. As shown, for example, the tongue 112 can extend to about half of the length of the bed frame 102, but in other embodiments the tongue 112 can extend less than or more than half of the length of the bed frame 102, depending on a particular implementation and desired balancing characteristics. For ease in illustration and description, the width of the components of the tongue 112 is shown as being greater than the width of components of the bed frame 102, but the invention is not limited to this embodiment. Similar to other components, the tongue 112 can comprise any combination of materials that provides adequate strength and support, such as steel.

The tongue 112 and the bed frame 102 are connected to one another using one or more hinges 110. The hinges 110 create one or more hinge points, permitting the bed frame 102 to tilt relative to the tongue 112 into a dumping and/or loading position, as shown in FIGS. 2A-2D and described later. While the hinges 110 are illustrated as being mounted on the outside of the bed frame 102, the hinges 110 can, in one or more other embodiments, be mounted on the inside of the bed frame 102 or between the bed frame 102 and the tongue 112. Any type of hinge 110 that enables the bed frame 102 to tilt relative to the tongue 112 falls within the scope of this disclosure. In one or more particular embodiments, the hinges 110 each comprise male/female hinges/brackets, each connected to one of the bed frame 102 or the tongue 112, and which are held together using a fastening mechanism. For instance, each hinge 110 can comprise a female hinge bracket attached (e.g., via bolting, welding, etc.) to an outer edge of the bed frame 102 and which hangs down from the bottom and near the center of the bed frame 102. Each female hinge bracket can be held to a corresponding male hinge that is attached (e.g., via bolting, welding, etc.) to the tongue 112. The male/female components of each hinge 110 can be held together using one or more of pins, snap rings, and the like. While the illustrated trailer has only one hinge point, multiple hinges can be used to create a plurality of hinge points.

The tongue 112 can also comprise a bed-to-tongue lockdown mechanism 116 (e.g., pins, bolts, etc.) that holds the bed frame 102 to the tongue 112 to prevent tilting of the bed frame 102 relative to the tongue 112 during towing (ensuring stability and safety). The bed-to-tongue lockdown mechanism 116 can be operated manually or with the assistance of motors, engines, hydraulics, and the like. The bed-to-tongue lockdown mechanism 116 can be located in any appropriate location on the trailer, such as at the side (e.g., one or two on either side), at the front (as shown), or any at other appropriate location. In addition, the tongue 112 includes a hitch 114 (e.g. an adjustable pindle or ball hitch) for attaching the trailer to a towing vehicle.

The sliding dump trailer can comprise a variety of other components that can assist with operation of the trailer. For instance, the trailer can include cushioning rams (e.g., one or more rams located forward of each hinge 110) that allow for a safe and controlled return of the bed frame 102 to the tongue 112 after it has been tilted. The cushioning rams can comprise individual closed systems (e.g., air, spring, hydraulic, gas) with adjustment mechanisms (e.g., an inline adjustable check valve) which allow for quick extension of a cylinder rod, and a slow return of the cylinder rod. The trailer can also comprise one or more mechanisms that allow for a slow and controlled tilting of the bed (e.g., for unloading valuables). In addition, the slide rails 104 can include one or more return springs that allow for a smooth and controlled return of the axle frame(s) 106 to an initial position when the bed frame 102 is in a dumping or loading position. Furthermore, the bed frame 102 can include one or more ground engagers (see item 212, FIGS. 2A-2D) which engage the ground to prevent slippage during dumping, and one or more counterweights (see item 210, FIGS. 2A-2D) that create a weight differential in the bed frame 102 and that encourage tilting of the bed frame 102. Ground engagers can come in many forms. For instance, some ground engagers can fill a gap between the ground and a top, rear corner of the trailer when dumping, but other types of ground engagers can engage the ground in other ways. To support movable axle frame(s) 106, the sliding dump trailer can also employ looped brake lines which are retracted and extended by springs. The brake lines can be used to lock the tires on the at least one axle frame 106, thereby ensuring that at least one axle frame 106 remains stationary with respect to the ground while dumping.

The unique combination of sliding axles and a hinged tilting bed enables the sliding dump trailer to be used for dumping or loading without the safety and convenience concerns that accompany dumping trailers. While the sliding dump trailer can be operated by purely mechanical manipulations (e.g., by moving one or more axle frames forward or reverse), one or more embodiments also combine conventional devices for dumping a dump trailer (e.g., electrical, combustive, and/or hydraulic lifts) with the disclosed combination of sliding axles and a hinged tilting bed.

Operation of the sliding dump trailer is now described with reference to FIGS. 2A-2D and the components and structure of FIG. 1.

Figure 2A:
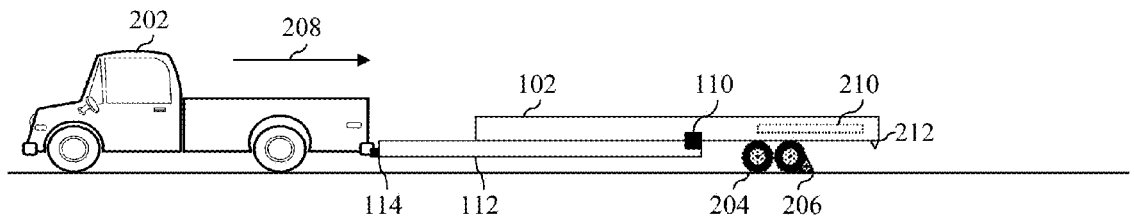
FIG. 2A-2D illustrate exemplary steps in dumping a sliding dump trailer that incorporates one or more embodiments of a sliding axle with a hinged tilting bed frame.

FIG. 2A illustrates a side view, according to one or more embodiments, of setting up a sliding dump trailer for dumping or loading. As shown, the tongue 112 of the sliding dump trailer is connected to a towing vehicle 202 using the hitch 114. To begin dumping/unloading, a user unlocks the bed frame 102 from the tongue 112 using the bed-to-tongue lockdown mechanism (116), and locks the wheels 204 on any axle frame(s) (106) that the user wishes to slide along the slide rails (104). The user also disengages the pins (106a) from the pin holes (104a) of the slide rails (104). The user can then back up the towing vehicle 202, as indicated by the arrow 208.

Locking the wheels 204 can comprise locking trailer brakes and/or chocking the wheels 204. For ease in description, FIGS. 2A-2D illustrate a chock 206 being used. Furthermore, disengaging the pins (106a) can involve the user pulling a manually operated handle or lever, or using another actuation device. On a trailer having a single axle frame (106), as shown, the user unlocks this axle frame (and locks the corresponding wheels). On a trailer having multiple axle frame(s) (106), the user typically unlocks the rearmost axle frame (and locks the corresponding wheels).

Figure 2B:
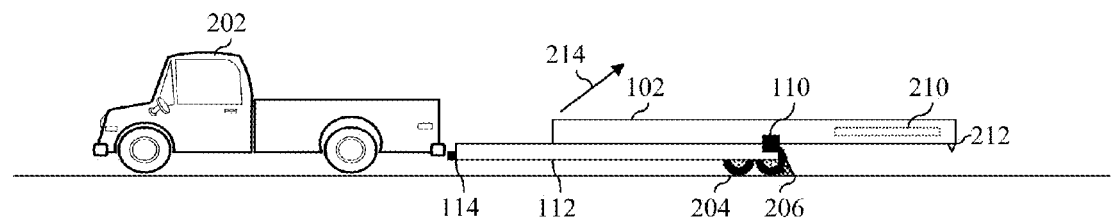

As shown in FIG. 2B, because the wheels 204 are locked and the corresponding axle frame(s) (106) are free to slide along the slide rails (104), the wheels 204 will move forward along on the slide rails (104) as the towing vehicle 202 reverses (or, from a different perspective, the bed frame 102/slide rails (104) will reverse relative to the wheels 204), altering the balance of the bed frame 102 on the axle frame(s) (106). As such, the axle frame(s) (106) reach a position at which the axle frame(s) (106) no longer support the rear of the bed frame 102. When the axle frame(s) (106) reach this position, gravity will cause the bed frame 102 to naturally tilt backwards (as indicated by the arrow 214) and fall to the ground around a hinge point, or a point at which one or more hinges 110 attach the tongue 112 to the bed frame 102. The bed frame 102 can include one or more ground engaging mechanisms 212 to help obtain a firm grip with the ground and to avoid slippage.

The particular position of the axle frame(s) (106) which causes the bed frame 102 to tilt depends on a number of factors, including the overall weight characteristics of the trailer; the size and distribution of any load; the size, number, and position of the axle(s) and axle frame(s); topographical characteristics of the ground; prevailing winds; weight differential (counterweight) of the bed frame 102; the height of the bed frame 102 from the ground; the length from the rear of the bed frame 102 to a hinge point (e.g., based on the location of hinges 110 and the relative length of the tongue 112 and the bed frame 102); etc. Depending on all these factors, the position of the axle frame(s) (106) can correspond to the location of a hinge point, or can correspond to a different location than a hinge point. Particularly when the load is light or when multiple axle frames (106) are in use, it may be advantageous to include a counterweight 210 in the rear of the bed frame 102 that causes a weight differential in the bed frame 102 (i.e., the rear of the bed frame 102 weighs more than the front of the bed frame 102). In some embodiments the counterweight 210 is a static weight built into the bed frame 102 itself, while in other embodiments the counterweight 210 is adjustable for particular applications.

Figure 2C:
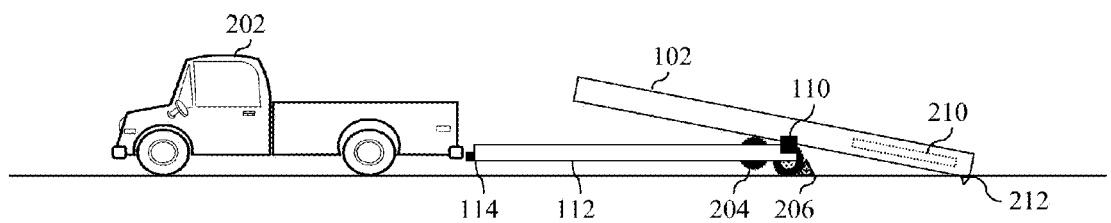

FIG. 2C illustrates the bed frame 102 in a tilted position, which can be used for loading/unloading. While in the position of FIG. 2C, the bed frame 102 serves as a ramp to facilitate loading or unloading cargo/equipment. The cargo can be driven, pushed, pulled, pulled via winch, lifted, etc. onto the bed frame 102. When the loading/unloading is finished, the towing vehicle 202 can pull forward, with the wheels 204 still locked (e.g., using brakes or chocks). This, in turn, will shift the wheels 204/axle frame (106) back to the rear of the bed frame 102 and return the bed frame 102 to the horizontal position where it is again supported by the axle frame (106). Cushion rams can help ensure a slow and controlled return. The towing vehicle 202 can pull forward until the axle frame (106) is in a desired towing position, or until the position is ideal for the weight being towed. Once in position, the pins (106a) and the bed-to-tongue lockdown mechanism (116) can be re-engaged and the wheels 204 can be unlocked.

Figure 2D:
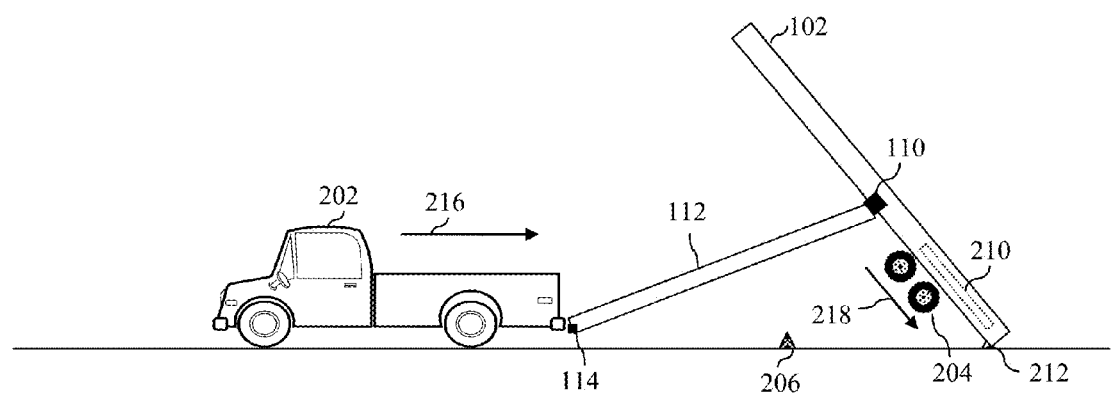

As shown in FIG. 2D, the user can alternatively continue to reverse the towing vehicle 202 (as indicted by the arrow 216) to conduct a dumping operation. During a dumping operation, the bed frame 102 can continue to be tilted to a potentially vertical position. A tilt stopper, such as a cable, bar, bolt, chain, rope, strap, shock, spring or other similar device, may be used to prevent the bed frame 102 from tilting beyond a predetermined angle (i.e., past vertical). During dumping operations, the ground engaging mechanisms 212 can be particularly useful to prevent slippage of the bed frame 102. As shown and indicated by the arrow 218, the axle frame (106) can freely slide to the back of the bed frame 102 on the slide rails (104) as the bed frame 102 tilts. As indicated previously, the axle frame (106) can be cushioned/captured by return springs. Alternatively, prior to commencing the dumping operation (e.g., as the bed frame 102 tilts to the loading position), the user can re-engage the pins (106a) which prevents the axle frame (106) from slipping on the slide rails (104) to the rear of the bed frame 102.

Returning the trailer to the horizontal position after a dumping operation is similar to the process described above in connection with FIG. 2C. If the axle frame (106) previously slid to the rear of the bed frame 102, the pins (106a) can be engaged and the towing vehicle 202 can pull forward until the bed frame 102 returns to a horizontal position. Cushion rams can help ensure a slow and controlled return. If the axle frame (106) was previously locked, the towing vehicle 202 can pull forward until the axle frame (106) reaches the loading position (FIG. 2C), and then the bed frame 102 can be returned to horizontal as described above (i.e., by disengaging the pins (106a) and continuing to pull forward). In either case, once the bed frame 102 is horizontal the user can reengage the bed-to-tongue lockdown mechanism (116) and ensure that all relevant pins (106a) are engaged.

Thus, one or more embodiments provide dumping trailers that use sliding axles to allow gravity to tilt a bed frame over a hinge point. One or more hinge points can be provided through a plurality of hinges that attach the bed frame to a towing platform. By altering the location of one or more axles, the bed frame can therefore be caused to tilt about a hinge point. The foregoing can be accomplished using mechanical mechanisms, and can be done with significant savings in terms of cost, convenience, and maintenance when compared with conventional trailers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A dumping trailer, comprising:
   a bed frame attached to a towing tongue using one or more hinge mechanisms that create one or more hinge points between the bed frame and the towing tongue, the bed frame being tiltable relative to the towing tongue by means of the one or more hinge mechanisms such that in a towing position, the bed frame and the towing tongue are disposed substantially parallel one to another and in a dumping position, an angle between the bed frame and the towing tongue is tiltable up to a substantially vertical position in which wheels associated with an axle frame are lifted off a horizontal ground plane;
   one or more slide rails attached to the bed frame; and
   the axle frame is secured to the one or more slide rails, one or more of the axle frame or the one or more slide rails including one or more locking mechanisms that selectively engage and disengage the axle frame with the one or more slide rails, wherein when the one or more locking mechanisms are disengaged the axle frame is free to slide along the one or more slide rails.

2. The dumping trailer of claim 1, wherein the one or more locking mechanisms comprise one or more pins that are connected to the axle frame and that engage with a plurality of incremented pin holes in the one or more slide rails.

3. The dumping trailer of claim 2, wherein the plurality of incremented pin holes are positioned vertically or horizontally in each of the one or more slide rails.

4. The dumping trailer of claim 2, further comprising a pull mechanism that is connected to the axle frame that selectively engages and disengages the one or more pins with the plurality of incremented pin holes.

5. The dumping trailer of claim 4, wherein the one or more slide rails comprise a plurality of parallel slide rails, and wherein the pull mechanism is positioned between the plurality of parallel side rails.

6. The dumping trailer of claim 1, further comprising one or more axles attached to the axle frame, and two or more wheels attached to each of the one or more axles.

7. The dumping trailer of claim 6, further comprising a wheel locking mechanism that locks the two or more wheels.

8. The dumping trailer of claim 1, further comprising a bed-to-tongue lockdown mechanism that selectively holds the bed frame to the tongue and that selectively prevents tilting of the bed frame relative to the tongue.

9. The dumping trailer of claim 1, wherein the axle frame is attached to the one or more slide rails using one or more "C" brackets.

10. The dumping trailer of claim 1, wherein the one or more slide rails ride on polytetrafluoroethylene friction-reducing strips.

11. The dumping trailer of claim 1, further comprising one or more ground engaging spike mechanisms located at a rear portion of the bed frame and adapted to dig into the ground so as to obtain a grip, thereby creating a pivot point at the one or more ground engaging spike mechanisms about which the bed frame is tiltable up to the vertical position.

12. The dumping trailer of claim 1, wherein the bed frame further comprises a front portion proximal to the towing tongue and the one or more hinge mechanisms, a rear portion distal to the towing tongue and the one or more hinge mechanisms, the one or more hinge mechanisms dividing the front portion from the rear portion being disposed at a center of the bed frame, so that the front portion and rear portion are front and rear halves of the bed frame, and an adjustable counterweight in the rear portion of the bed frame, the adjustable counterweight being separate from and in addition to a weight of the rear portion of the bed frame itself, the adjustable counterweight creating a weight differential in the bed frame, such that the rear portion of the bed frame weighs more than the front portion of the bed frame.

13. The dumping trailer of claim 1, wherein the one or more hinge mechanisms create a plurality of hinge points.

14. The dumping trailer of claim 1, wherein the one or more slide rails comprise a plurality of slide rails, the one or more locking mechanisms comprising:
   a plurality of incremented pin holes in each of the plurality of slide rails; and
   a plurality of pins that are connected to the axle frame so as to selectively engage with the plurality of incremented pin holes in the plurality of slide rails.

15. The dumping trailer of claim 1, wherein:
   in the towing position, the bed frame and the entirety of the towing tongue are disposed in a horizontal position relative to a horizontal ground plane;
   in a loading position, the bed frame is tilted to a loading angle relative to the towing tongue, the loading angle being greater than a 0° angle between the bed frame and the towing tongue in the towing position, the bed frame being adapted to engage the ground in the loading position; and
   in the dumping position, the bed frame is tilted relative to the towing tongue to an angle that is greater than the loading angle such that wheels associated with the axle frame are lifted off the horizontal ground plane as the bed frame tilts to a potentially vertical position.

16. The dumping trailer of claim 1, wherein the one or more hinge mechanisms are disposed at or near the center of the bed frame.

17. A dumping trailer, comprising:
   a bed frame attached to a planar towing tongue, the entire towing tongue being planar, and the entirety of the towing tongue being disposed beneath the bed frame, the towing tongue extending rearwardly under at least half a length of the bed frame, the towing tongue being attached to the bed frame using one or more hinge mechanisms that create one or more hinge points between the bed frame and the towing tongue, the one or more hinge mechanisms being disposed at or near a center of the bed frame, such that an angle between the bed frame and the towing tongue is tiltable up to a substantially vertical position in which wheels associated with an axle frame are lifted off a horizontal ground plane;
   one or more slide rails attached to the bed frame; and
   an axle frame secured to the one or more slide rails, one or more of the axle frame or the one or more slide rails including one or more locking mechanisms that selectively engage and disengage the axle frame with the one or more slide rails, wherein when the one or more locking mechanisms are disengaged the axle frame is free to slide along the one or more slide rails.

18. A dumping trailer, comprising:
   a bed frame attached to a planar and horizontal towing tongue using one or more hinge mechanisms that create one or more hinge points between the bed frame and the towing tongue, the bed frame being tiltable relative to the towing tongue by means of the one or more hinge mechanisms;
   one or more slide rails attached to the bed frame; and
   an axle frame secured to the one or more slide rails, one or more of the axle frame or the one or more slide rails including one or more locking mechanisms that selectively engage and disengage the axle frame with the one or more slide rails, wherein when the one or more locking mechanisms are disengaged the axle frame is free to slide along the one or more slide rails, wherein:
   in a towing position, both the bed frame and the towing tongue are disposed in a substantially horizontal position relative to a horizontal ground plane, the bed frame being parallel to the towing tongue in the towing position, the planar towing tongue being entirely in a given horizontal plane relative to the horizontal ground plane;
   in a loading position, the bed frame is tilted to a loading angle relative to the towing tongue, the loading angle being greater than an angle between the bed frame and the towing tongue in the towing position, the bed frame adapted to engage the ground in the loading position, and where wheels associated with the axle frame remain in contact with the horizontal ground plane in the loading position; and in a dumping position, the bed frame is tilted relative to the towing tongue to a substantially vertical position at an angle that is greater than the loading angle and the axle frame and the wheels associated therewith are lifted off the horizontal ground plane in the dumping position.

\* \* \* \* \*